Oct. 12, 1937.  W. T. OBERTO  2,095,511
ANESTHESIA DEMONSTRATION DEVICE
Filed March 8, 1937  2 Sheets-Sheet 1
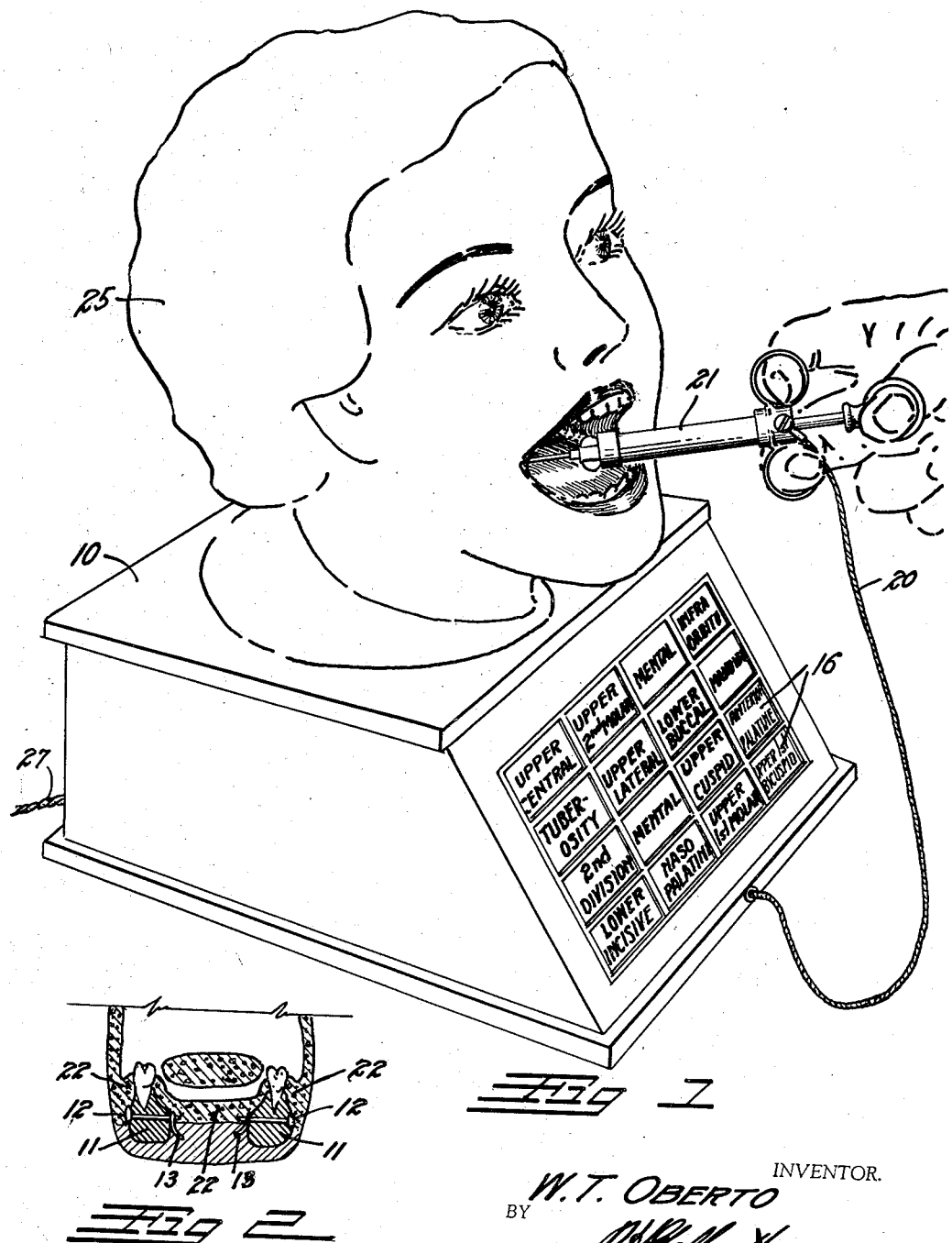
INVENTOR.
W. T. OBERTO
BY
ATTORNEY.

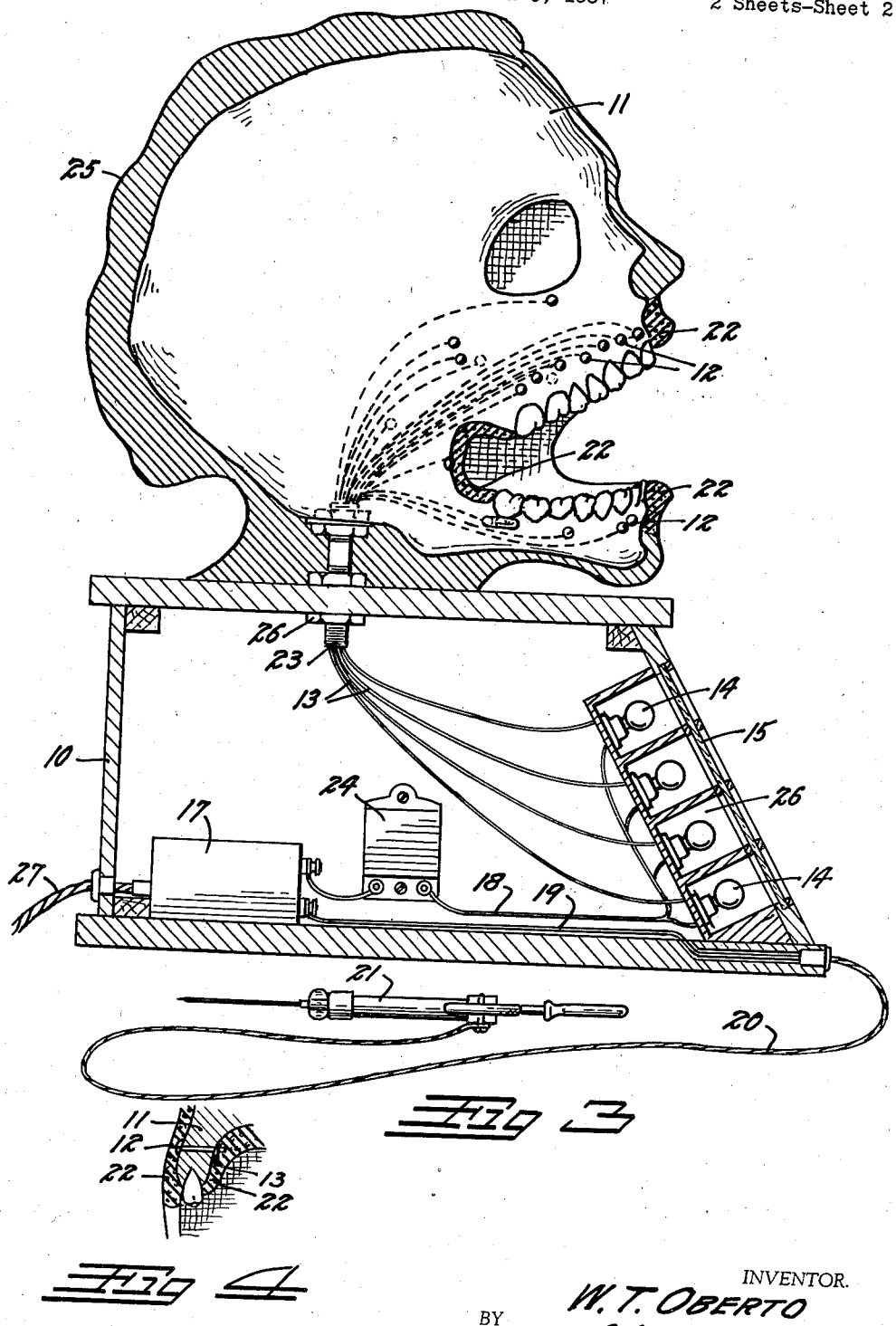

Patented Oct. 12, 1937

2,095,511

UNITED STATES PATENT OFFICE 2,095,511

ANESTHESIA DEMONSTRATION DEVICE

William T. Oberto, Denver, Colo.

Application March 8, 1937, Serial No. 129,608

6 Claims. (Cl. 32—71)

This invention relates to a device for demonstrating and instructing physicians, dentists, and students, in the technic of "nerve-block" anesthesia. The principal object of the invention is to provide a model patient's head with an oral cavity having resilient buccal and lingual surfaces into which an injection needle may be inserted, and to conceal beneath these surfaces at the proper points on the desired nerve locations, electrical contacts which, if contacted by the needle will give either or both an audible and visible indication that the proper position has been accurately reached.

The device is particularly useful in training the hands and the eye of students so that they will be skilled in placing the hypodermic needle at the proper points to anesthetize the desired nerves.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a perspective view illustrating the complete device in use.

Fig. 2 is a detail inferior maxillary section of the model employed with the device.

Fig. 3 illustrates a vertical section through the complete device. In this section the skull portion of the model is not cut by the section but is shown in side elevation.

Fig. 4 is a detail superior maxillary section of the model.

The invention comprises a suitable supporting cabinet 10 upon which is mounted a model of a human head such as indicated at 25. The head is preferably molded of a suitable resilient compound such as "Koragel" over a skull 11. The portions of the model which represent the tissues which invest the necks of the teeth and cover the alveolar parts of the jaws are formed of porous or "sponge" rubber as indicated at 22. The skull is preferably an exact reproduction of a human skull and serves not only as a foundation for the head mold, but also as a foundation or support for a series of electrical contact points 12 which are attached to the skull at points corresponding to the proper anesthetizing points on the nerve locations serving the oral cavity.

The contacts 12 are preferably headed metal tacks or screws inserted through the skull 11 and completely concealed by the overlying sponge rubber. From each contact, an electrical conductor 13 extends downwardly through the neck of the model. The conductors 13 are led into the supporting cabinet 10 and each terminates in an electric light bulb 14.

The bulbs 14 are preferably placed to the rear of a glass plate 15 upon which are lettered the names of the various nerves or descriptions of the various oral areas which the individual nerves serve, as shown at 16, in Fig. 1. Current is fed to the bulbs from a suitable transformer 17 through a main conductor 18. The other lead from the transformer, indicated at 19, is conducted through a flexible cord 20 to a hypodermic syringe 21 of the type used for local anesthesia or "nerve block" operations.

The "sponge" rubber cushion which represents the mouth tissue permits the needle of the syringe 21 to be easily and repeatedly inserted without damage and without disclosing the points of perforation.

In use, the operator selects the mouth section which he desires to anesthetize. He then inserts the needle of the syringe into the sponge rubber 22 in the direction of the nerve which serves the chosen section. If the needle is correctly inserted, its point will strike the contact 12 representing the proper nerve position for the chosen section. This causes the lamp in circuit with that contact to illuminate one of the plates 16 to display either the name of the desired nerve or the description of the section which would be anesthetized. The circuit to the contact is, of course, completed through the cord 20 and the syringe 21.

If desired, an audible signal such as an electric buzzer or bell can be placed in series with the main lead 18 as shown at 24, so that whenever a contact is made, an audible signal will indicate the closing of the circuit and a visible signal will indicate which one of the contacts has been reached.

By forming the cheeks, gums, and tongue of the model from sponge rubber, they can be manipulated with the fingers similarly to the natural surfaces and can be pierced many times with the needle without showing holes or perforations which would indicate to other users, the sought positions.

For structural reasons, it is preferred to rigidly support the skull 11 on a short pipe nipple 23 which is clamped to the cabinet 10 by means of clamp nuts 26 to securely hold the model in place.

The nipple 23 also serves as a convenient conduit for the conductors 13.

While the invention has been described simply as pertaining to the nerves of the oral cavity of the human body, it could of course be expanded to include any other desired portion or portions of the body or a complete body model could be employed if desired. A model representing the human vertebral column could be used for demonstrating and instructing in spinal anesthesia.

The indicating lamps are illustrated in the face of the supporting cabinet. They could, of course, be placed at any desired location, even at a distance from the model if desired. The principal feature of the invention is the concealing of electrical contacts within a model at points where it is desirable for an injection needle to reach so that a definite indication will be given the operator when the needle has been correctly and properly inserted. The device is easily portable. An electric cord 27 can be led from the transformer 17 to any convenient electric outlet.

While a specific form of the improvement has been described and illustrated herein, it is desired to be understood that the same may be varied, within the scope of the invention.

Having thus described the invention, what is claimed and desired secured by Letters Patent is:—

1. A device for demonstrating local anesthesia comprising: a model of a portion of the human body; electrical contacts concealed below the surface of said model at points corresponding to nerve location in the human body; a signal system in circuit with said contacts; and a probing member in the circuit of said system so that when the probing member is inserted through the surface of the model, an indication will be given provided one of the contacts is contacted by said probing member.

2. A device for demonstrating local anesthesia comprising: a model of a portion of the human body; electrical contacts concealed below the surface of said model at points corresponding to nerve location in the human body; a signal system in circuit with said contacts; a probing member in the circuit of said system so that when the probing member is inserted through the surface of the model, an indication will be given provided one of the contacts is contacted by said probing member; a chart containing designations referring to the individual contacts; and an electric lamp for each designation on said chart, each of said lamps being in circuit with one of said contacts.

3. A device for demonstrating the technic of local anesthesia comprising: a model of the human head; flexible, perforatable surfaces representing the tissues of the mouth of said head; a series of contacts covered by said surfaces, each of said contacts being positioned at a point corresponding to a nerve location in the human head; a series of electric lamps; a conductor leading from each of said contacts to one of said lamps; and a chart carrying a series of designations referring to the location of said contacts, each of said lamps being arranged to illuminate one of said designations.

4. A device for demonstrating the technic of local anesthesia comprising: a model of the human head; flexible, perforatable surfaces representing the tissues of the mouth of said head; a series of contacts covered by said surfaces, each of said contacts being positioned at a point corresponding to a nerve location in the human head; a series of electric lamps; a conductor leading from each of said contacts to one of said lamps; a chart carrying a series of designations referring to the location of said contacts, each of said lamps being arranged to illuminate one of said designations; a flexible cord in circuit with said lamps; a probing member representing a hypodermic syringe secured on the extremity of said cord so that when the latter is inserted into said surfaces, a circuit will be closed when one of said contacts is contacted to illuminate a designation on said chart.

5. A local anesthesia demonstration device comprising: a skull member representing a human skull; sponge-like rubber covering the alveolar portions of said skull member; electric contact members supported by said skull member and concealed by said rubber covering; and an electric signal device in circuit with each of said contacts.

6. A local anesthesia demonstration device comprising: a skull member representing a human skull; sponge-like rubber covering the alveolar portions of said skull member; electric contact members supported by said skull member and concealed by said rubber covering; a cabinet supporting said skull member; a translucent face in said cabinet carrying designations referring to the position of said contacts; a probing member; and a series of lamps in said cabinet, each of said lamps being positioned opposite one of the designations so that the latter will become illuminated when its cooperating contact is closed.

WILLIAM T. OBERTO.